(12) United States Patent
Cultraro

(10) Patent No.: US 7,740,116 B2
(45) Date of Patent: *Jun. 22, 2010

(54) DEVICE FOR SLOWING THE MOVEMENT OF A DOOR, DRAWER OR SIMILAR MOVABLE MEMBER, HAVING RELEASABLE LOCKING MEANS

(76) Inventor: Antonino Cultraro, Via Möntëgrappa 26, Torino (IT) I-10098

( * ) Notice: Subject to any disclaimer, the term of this patent is extended or adjusted under 35 U.S.C. 154(b) by 620 days.

This patent is subject to a terminal disclaimer.

(21) Appl. No.: 10/550,892

(22) PCT Filed: Sep. 8, 2003

(86) PCT No.: PCT/IT03/00535
§ 371 (c)(1),
(2), (4) Date: Aug. 31, 2006

(87) PCT Pub. No.: WO2004/085777
PCT Pub. Date: Oct. 7, 2004

(65) Prior Publication Data
US 2007/0000742 A1    Jan. 4, 2007

(30) Foreign Application Priority Data
Mar. 27, 2003  (IT)  .......................... TO20030058 U

(51) Int. Cl.
 *F16D 57/02*   (2006.01)
(52) U.S. Cl. .......................... 188/294; 188/83; 188/290
(58) Field of Classification Search ................. 188/82.1, 188/83, 290, 293, 294, 296; 16/82, 85, 61, 16/62
See application file for complete search history.

(56) References Cited

U.S. PATENT DOCUMENTS

| 4,660,881 A | * | 4/1987 | Komeya et al. | ............. 188/290 |
| 4,694,530 A | * | 9/1987 | Foggini | ...................... 188/290 |
| 4,893,522 A | | 1/1990 | Arakawa | |

(Continued)

FOREIGN PATENT DOCUMENTS

EP       0 199 242 A2    10/1983

(Continued)

*Primary Examiner*—Thomas J Williams
(74) *Attorney, Agent, or Firm*—Hayes Soloway P.C.

(57) ABSTRACT

A device (15) for slowing the movement of a door (2) urged by unidirectional thrust means (4), including a casing (17) fixable to a structure (S) and defining a chamber (18) filled with a viscous fluid, and a rotor (31). The rotor (31) includes a disc portion (32) and a shaft portion (33) protruding through the lid (21) of the casing (17) in such a way as it can be associated with the door (2). The base surface (23a) of the chamber (18) has a recess (51) operable to house a pivotable arm (52). The arm (52) has a pin portion (54) protruding into the chamber (18). The lower surface (62) of the disc portion (32) of the rotor (31) has a groove (70) for engaging the pin portion (54) of the arm (52). At one end (73), the groove (70) has a cam (76) dividing it into a return path (75) and a forward path (74) for the pin portion (54) so as to define a locking position for the rotor (31) in cooperation with the thrust means (4).

5 Claims, 5 Drawing Sheets

U.S. PATENT DOCUMENTS

| | | | |
|---|---|---|---|
| 5,001,809 A * | 3/1991 | Kim et al. | 16/62 |
| 5,460,252 A | 10/1995 | Kosugi et al. | |
| 7,364,023 B2 * | 4/2008 | Cultraro | 188/290 |
| 2003/0183039 A1 * | 10/2003 | Ohta et al. | 74/574 |
| 2007/0158152 A1 * | 7/2007 | Cultraro | 188/290 |

FOREIGN PATENT DOCUMENTS

| | | |
|---|---|---|
| EP | 1 348 827 A | 10/2003 |
| GB | 2 062 933 A | 5/1981 |
| JP | 01015547 A * | 1/1989 |

* cited by examiner

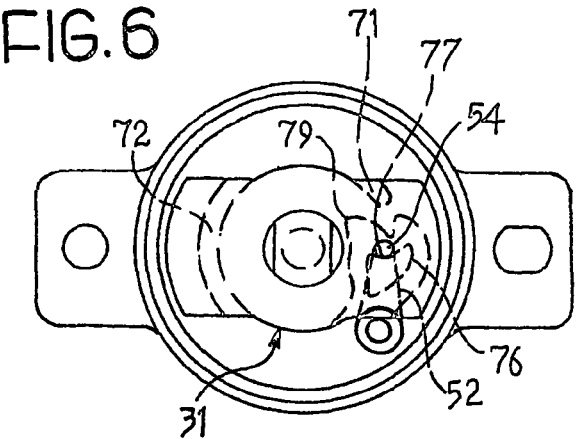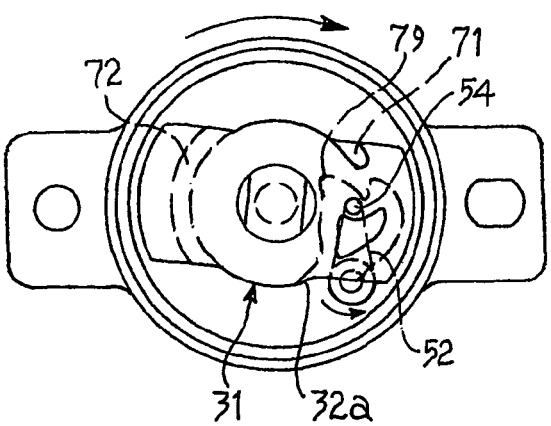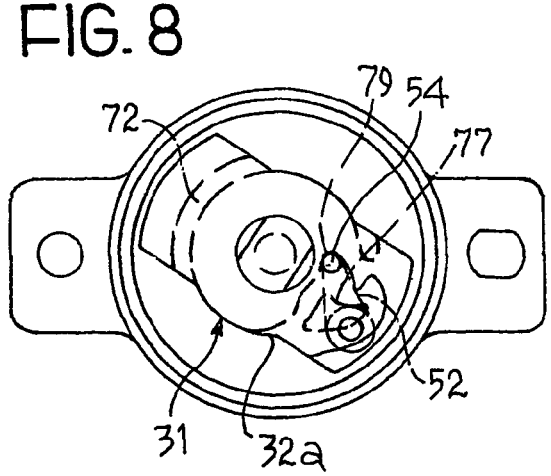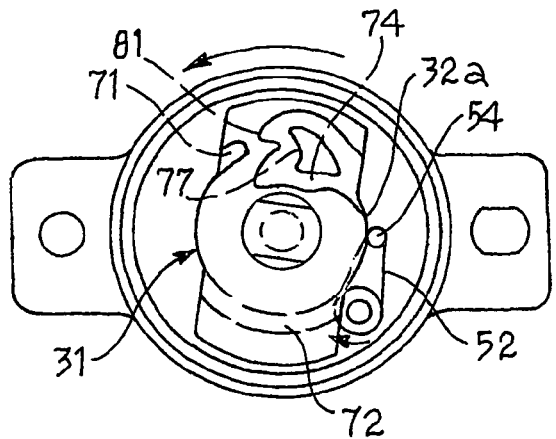

DEVICE FOR SLOWING THE MOVEMENT OF A DOOR, DRAWER OR SIMILAR MOVABLE MEMBER, HAVING RELEASABLE LOCKING MEANS

This is a National Stage entry of International Application PCT/IT2003/000535, with an international filing date of Sep. 8, 2003, which was published as WO 2004/085777 A1, and the complete disclosure of which is incorporated into this application by reference.

BACKGROUND OF THE INVENTION

A device for slowing the movement of a door, drawer or similar movable member, having releasable locking means.

The present invention relates to a device for slowing the movement of a door, drawer or similar member which is movable with respect to a fixed structure and urged by unidirectional thrust means.

The present invention relates to a device for slowing the movement of a door, drawer or similar member which is movable with respect to a fixed structure and urged by unidirectional thrust means, of a type described in the preamble to Claim 1.

A device of this type is known from British Patent Application GB-A 2 062 933 and is normally used to smooth the movement of a slidable drawer caused by spring means, as used in certain types of ashtray fitted in the dashboard of motor vehicles, or of pivoted doors, of a type used, for example in tape recorder apparatus.

It is also known that such drawers or doors often have latch closure means which are released by a light pressure on the drawer, so that pressure is used to carry out both opening and closing operations.

The document U.S. Pat. No. 4,893,522 describes a rotary damper including a cylindrical rotor, a casing with a shaft for insertion into the cylindrical rotor and a cylindrical wall enclosing this shaft, with a viscous fluid between the inner surface of the cylindrical rotor and the casing shaft. A spiral spring is fitted between the cylindrical wall of the casing and the outer surface of the rotor and is wound up by the rotation induced by an applied torque. This device has incorporated latch closure means, including an excursion groove formed either in the inner surface of the casing lid or in an end surface of the cylindrical rotor and having a heart-shaped cam groove at one end and an operating pin either provided on the lid or on the cylindrical rotor, operable to slide along the groove.

The document EP-A-0 199 242 describes a device in which the latch closure means include a sphere engaged in a rectilinear groove, formed in the lateral surface of the stator, and urged by a shaped groove formed in the lateral wall of the rotor and having a cam defining a forward path and a return path for the sphere.

SUMMARY OF THE INVENTION

The object of the present invention is a device for slowing the movement of a door or drawer of a compact type, having the characteristics defined in the Claims.

BRIEF DESCRIPTION OF THE DRAWINGS

A few preferred but non-limitative embodiments of the invention will now be described with reference to the appended drawings, in which:

A preferred but non-limitative embodiments of the invention will now be described with reference to the appended drawings, in which:

FIGS. 6-14 are plan views illustrating the operation of the slowing device of the invention.

DETAILED DESCRIPTION OF THE INVENTION

Figure 1:
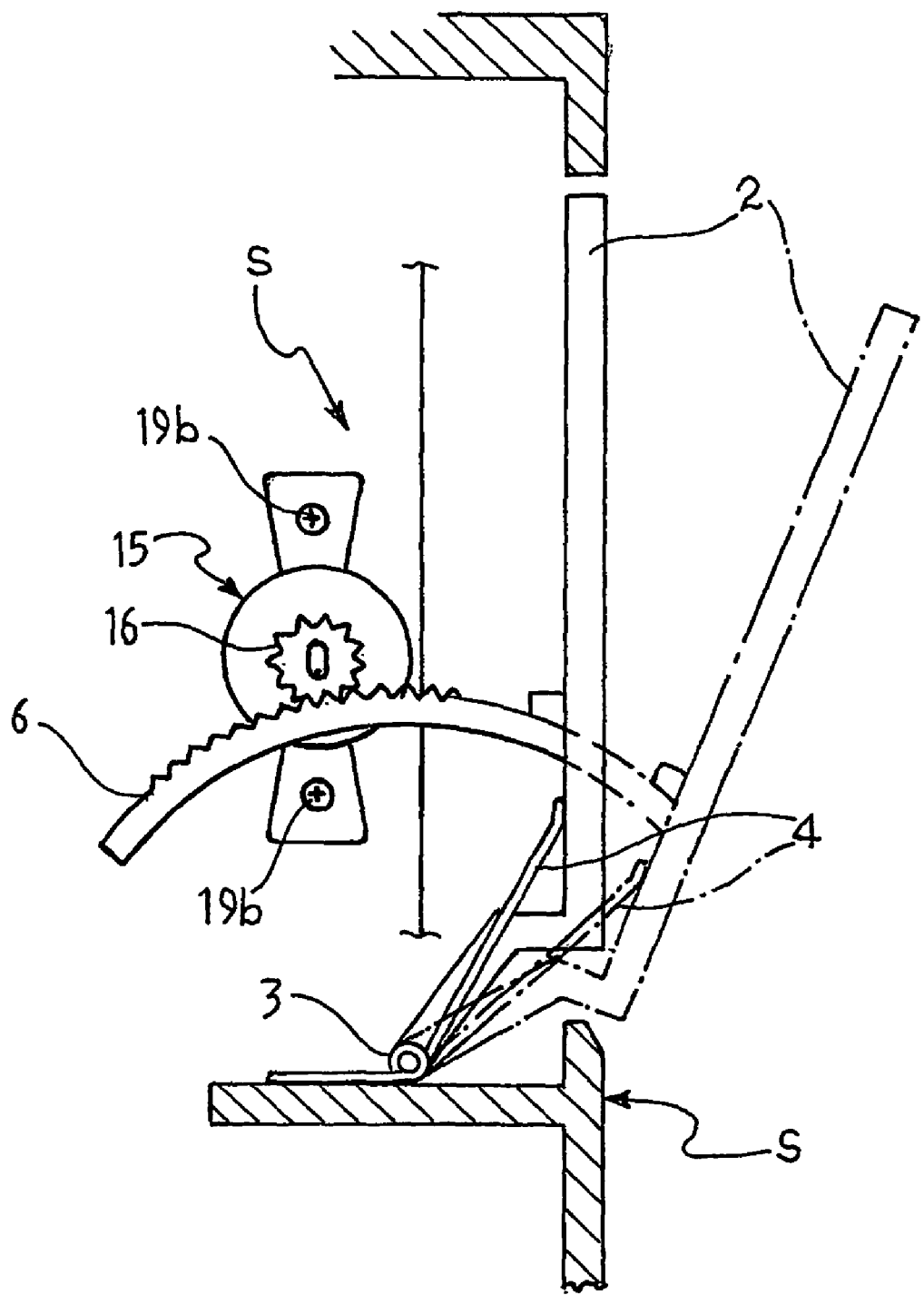
FIG. 1 is a longitudinally sectioned view of the structure of the door of a tape recorder incorporating a slowing device according to the invention.

With reference to FIG. 1, numeral reference 2 designates a door, for example, the door of a tape recorder, pivoted about a hinge 3 fixed to the structure S of this recorder, while 4 indicates a spring which urges the door into its open position. A curved rack 6, the centre of curvature of which coincides with the pivot axis of the door 2, is secured to this door. A slowing device 15 of the invention is also secured to the structure S of the recorder, with a rotatable pinion 16 arranged so as to engage the teeth of the rack 6.

Figure 2:
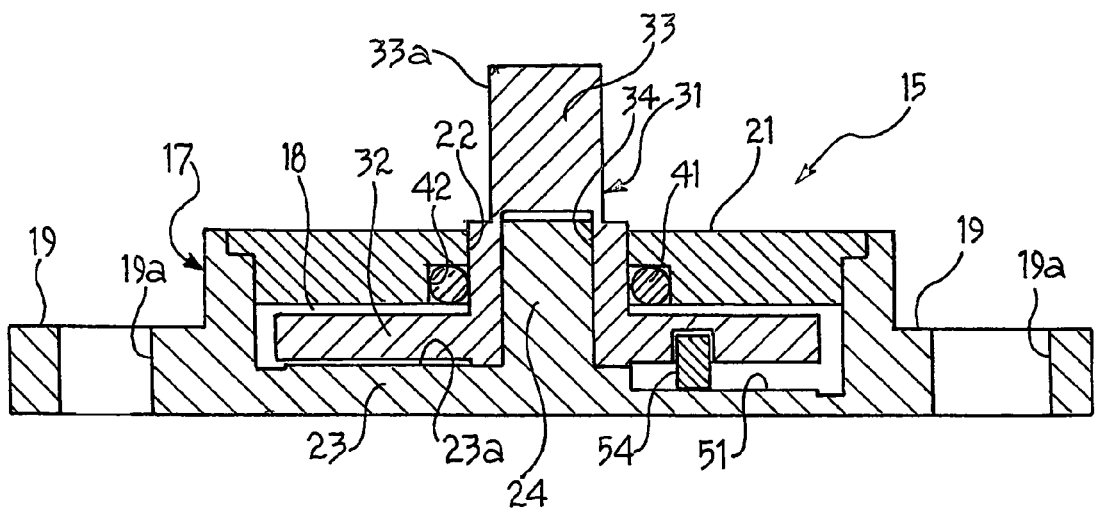
FIG. 2 is a longitudinally sectioned view of an embodiment of a slowing device according to the invention.

With reference to FIG. 2, the device 15 substantially includes a casing 17, defining internally a substantially cylindrical chamber 18 open at one end, and having a pair of lateral extensions 19 in which through holes 19a are formed for engaging fixing means 19b (shown in FIG. 1) such as screws, rivets and the like for rigidly securing these extensions 19 to the structure S of the recorder, with the pinion 16 engaged with the rack 6. The open end of the cylindrical chamber 18 is adapted to be closed by a lid 21 which is fixed to the casing 17 so as to provide a fluid tight seal, for example by gluing or welding. The lid 21 has a central through-hole 22. The base 23 of the cylindrical chamber 18, corresponding to the base of the casing 17, has a pin portion 24 which projects axially from the centre of the base 23 of the chamber 18 inwardly thereof.

The device 15 also includes a rotor 31 housed in the chamber 18. The rotor 31 includes a disc portion 32, rotatable inside the casing 17, and a shaft portion 33 which extends axially from the centre of the disc portion 32 and protrudes from the lid 21 of the casing 17, passing through the central hole 22. The free end 33a of the shaft portion 33 of the rotor 31 is arranged so the pinion 16 can be mounted thereon. The rotor 31 also has a central hole 34, formed in the base of the disc portion 32 for enabling the rotor 31 to be mounted on the pin portion 24 of the casing 17 and providing thereby an axis of rotation for the rotor.

The chamber 18 is filled with a highly viscous fluid of a known type, in such a way that the rotor 31 is fully immersed. The fluid tight seal at the central hole 22 is ensured by an O-ring 41 housed in a circular seat 42 formed around the central hole 22 through the lid 21.

Figure 3:
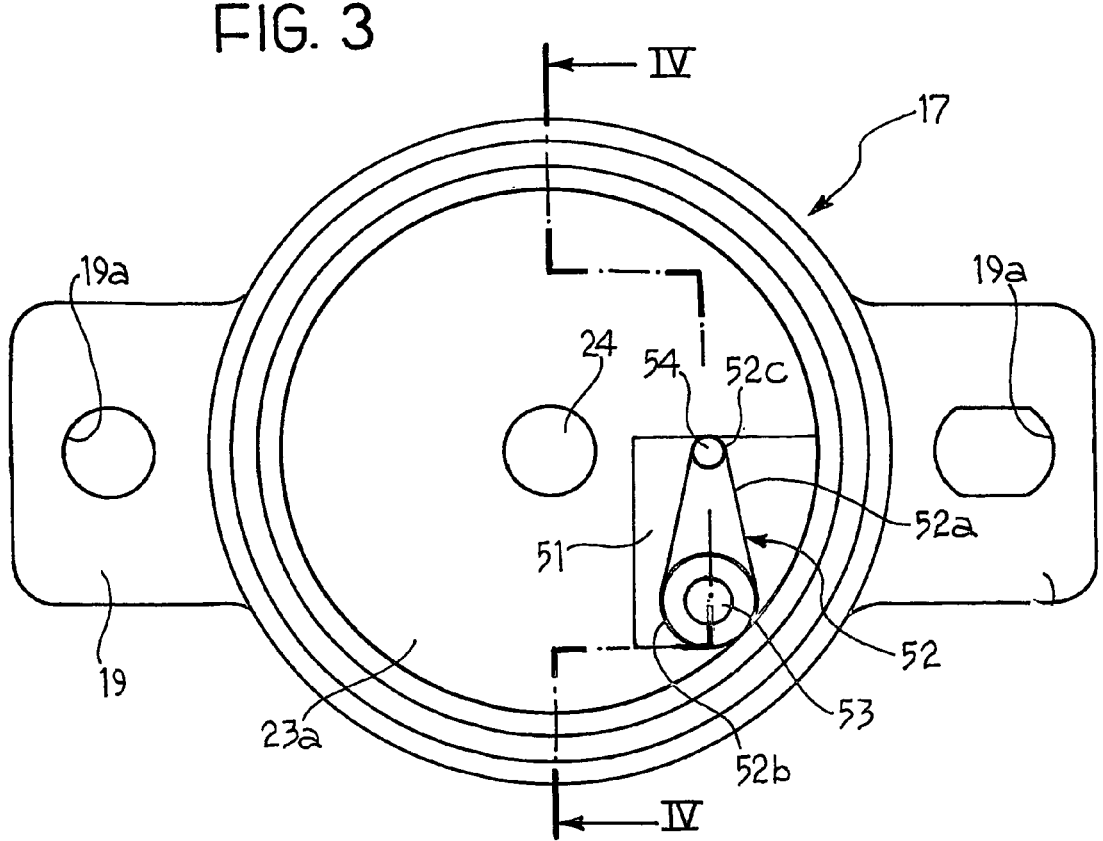
FIG. 3 is a plan view of a component of the device of FIG. 2.
Figure 4:
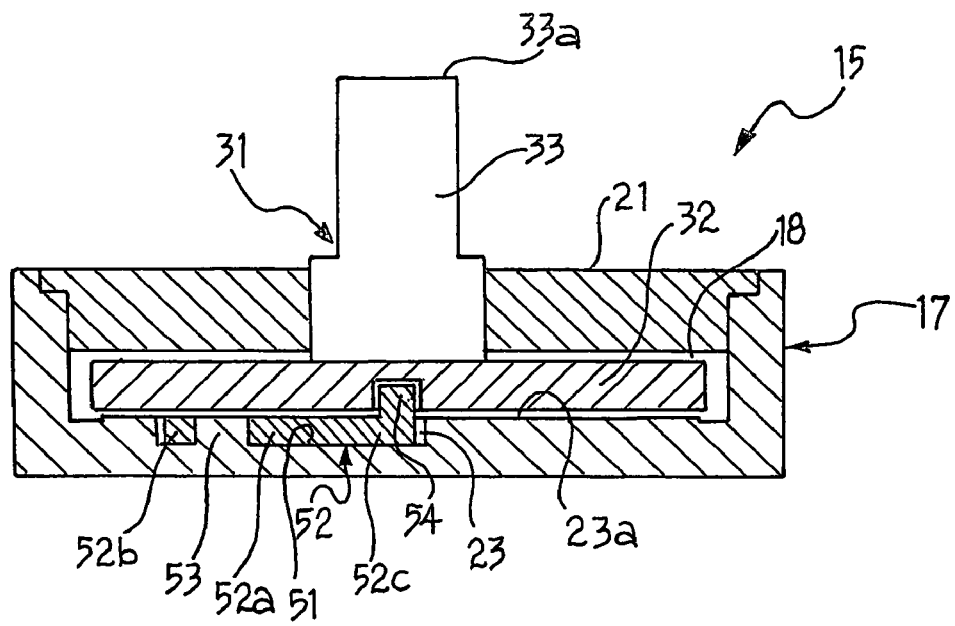
FIG. 4 is a section of the slowing device of FIG. 2 taken on the line IV-IV of FIG. 3

With reference also to FIGS. 3 and 4 (for the sake of clarity, in FIG. 3 the casing 17 is shown without the lid 21 and the rotor 31), the base surface 23a of the chamber 18 has a recess 51 with an arm element 52 housed therein, mounted pivotably on a pin 53 formed in one piece with the base of the recess 51. The arm element 52 includes an integrally formed elongate body 52a, with a thickness along the length of the device 15 less than or equal to the depth of the recess 51. One end 52b of the body 52a of the arm element 52 is pivoted on the pin 53, while the other end 52c has a pin portion 54 projecting from the base surface 23a inwardly of the cylindrical chamber 18. Due to this configuration, the arm element 52 is able to oscillate in the bottom of the recess 51, in a plane parallel to the base surface 23a. The shape of the recess 51 can be different from that shown in FIG. 3 but it must be able to allow the arm element 52 to pivot sufficiently in order for the device to operate, as will be described later.

Figure 5:
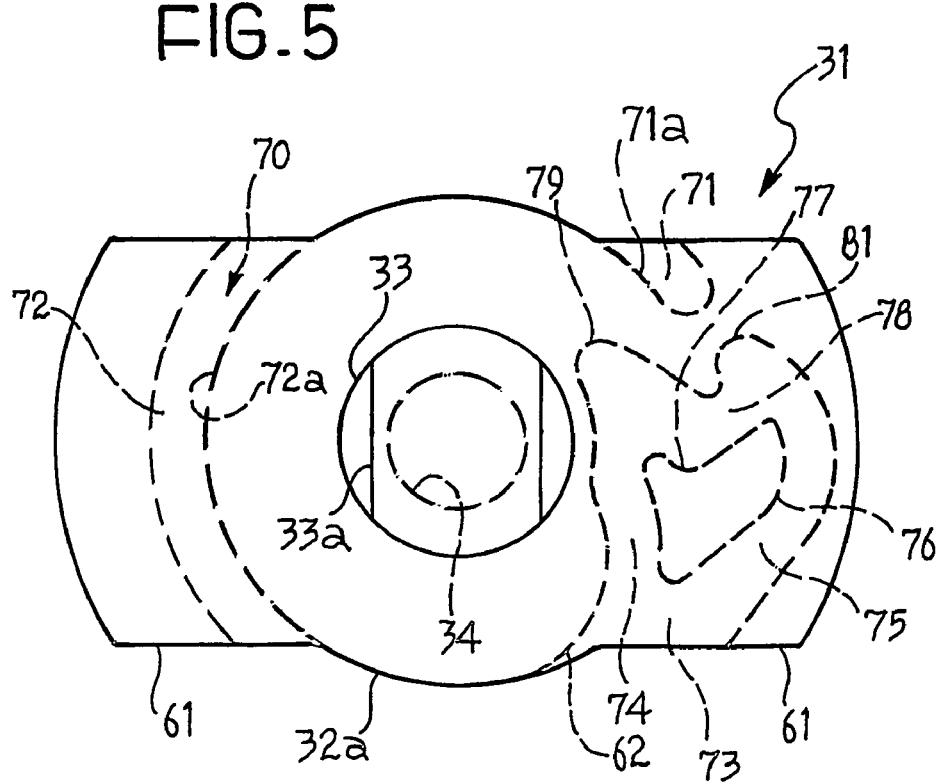
FIG. 5 is a plan view of another component of the device of FIG. 2.
Figure 10:
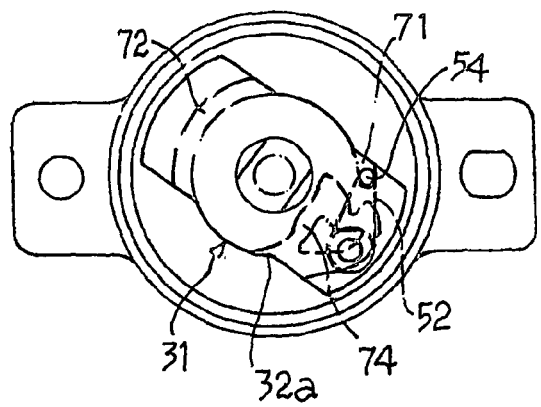
Figure 11:
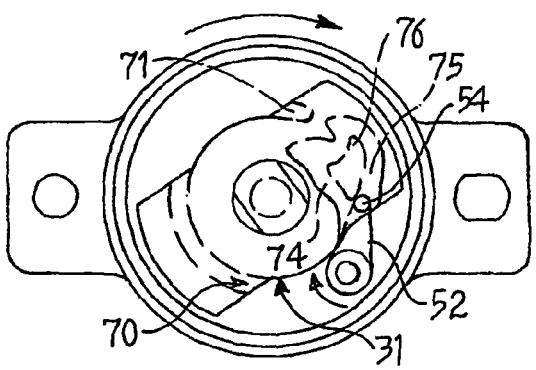

FIG. 5 is a plan view just of the rotor 31. It has a pair of vane portions 61 extending radially from diametrically opposite sides of the disc portion 32. An elongate groove 70 (shown in the broken line) is formed in the lower surface 62 of the disc portion 32 and of the paddle elements 61, that is the surface opposite the base surface 23a so as to extend concentrically with the shaft portion 33 of the rotor 31. In particular, this groove 70 extends to the edge of the disc portion 32 so it is substantially divided into three portions on the vane portions 61. The first and second portions 71, 72 constitute an end portion and an intermediate portion of a part of the groove 70 concentric with the shaft portion 33 of the rotor 31. These portions 71, 72 are formed in such a way that their radially inner walls 71a, 72a are blended with the side wall 32a of the disc portion 32. In an improved embodiment (not shown) the portion 72 is provided with flared ends so as to form mouths, the function of which will be explained later. The third portion 73 forms the opposite end of the groove 70 and extends so as to approximately form a ring, with forward and return branches 74, 75, respectively, and a cam portion 76 interposed between them. The radially inner wall of the mouth of the forward branch 74 is connected to the radially outer wall 32a of the disc element 32.

A recess 77 is formed in the cam portion 76, in front of which a cuspid branch 78 is extended which interconnects the two branches 74, 75 of the groove 70. The cuspid branch 78 defines two sharp bends 79, 81 at its ends, substantially opposite the recess 77 of the cam portion 76.

The groove 70 is engageable by the pin portion 54 of the arm element 51, which moves along the groove when the rotor 31 is rotated relative to the casing 17. After passing through the portions 71, 72, the pin portion 54 engages in succession the branches 75 and 74 of the groove 70, accompanied by the movement of the arm element 52, thereby accomplishing locking and release operations in the manner of the pressure latch system described with reference to the prior art.

FIGS. 6 to 14 illustrate the operation of the device according to the invention.

From the latched position (FIG. 6) in which the pin portion 54 engages the recess 77 of the cam portion 76, pressure applied on the door 2 causes a slight clockwise rotation of the rotor 31, by means of the rack 6 engaged with the pinion 16, thereby causing the pin portion of the arm to be moved away from the recess (see FIG. 7) until it reaches the bend 79, beyond which clockwise rotation is prevented (see FIG. 8). The arm element 52 pivots slightly anti-clockwise, following the movement of the pin portion 54 induced by the rotor 31.

When pressure on the door 2 is released, the spring 4 urges it until it is fully open. The movement transmitted to the rotor 31 causes it to rotate anti-clockwise, whereby the pin portion 54 (see FIG. 9) passes along the forward branch 74, the intermediate portion 72 and the end portion 71 until it reaches the end of travel position defined by the end portion 71 (see FIG. 10). In addition to slowing the movement of the rotor 31, and therefore of the door 2, the viscosity of the viscous fluid prevents the pin portion 54 and the arm portion 52, which pivot clockwise while moving along the forward branch 75, from moving away radially from the path of the groove 70 in the portion in which this is interrupted (see FIG. 9).

Figure 12:
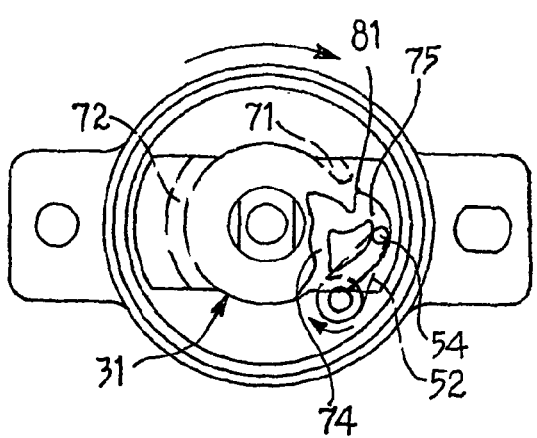

If pressure continues to be exerted on the door 2, the rotor 31 rotates clockwise (see FIG. 11) and the pin portion 54 returns along the groove 70 until it is diverted by the cam portion 76 into the return branch 75, whereby the arm element 52 reaches its position of maximum clockwise travel (see FIG. 12). The mouth of the forward branch 74 is much narrower than that of the return branch 75, in order to reduce the possibility of the pin element 54 entering this branch by mistake when it reaches the end portion 73 of the groove 70.

Figure 13:
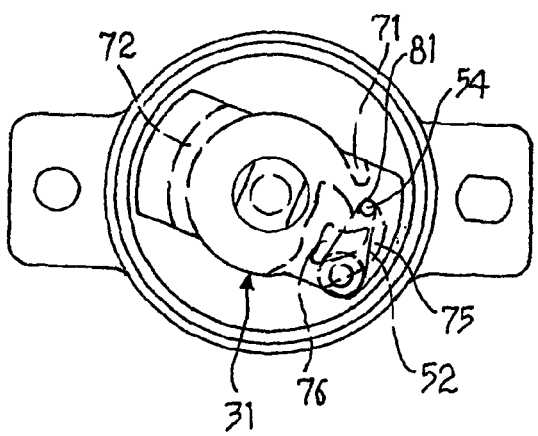
Figure 14:
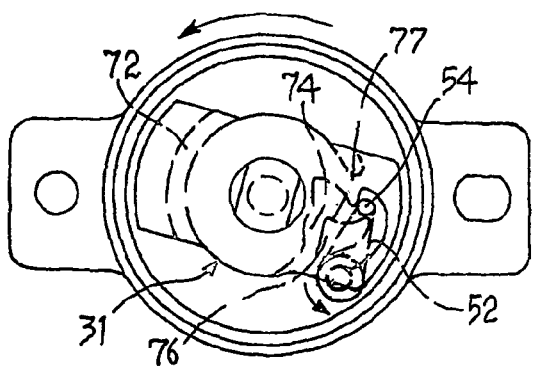

If pressure on the door 2 is continued, the rotor 31 rotates until the pin portion 54 engages the bend 81 of the return branch 75, which prevents further rotation (see FIG. 13).

If pressure is released, the action of the spring 4 causes the rotor 31 to rotate slightly anti-clockwise (see FIG. 14) and, thanks to the configuration of the cuspid branch 78, the pin portion 54 is guided to the recess 77 of the cam portion 76, once again locking the rotor 31 into the starting position shown in FIG. 1.

It will be appreciated that, although it has internal latch means, the slowing device according to an embodiment of the invention has a structure which is more compact and is simpler to manufacture than the prior art, wherein the axial depth of the casing can be of only a few millimeters, while maintaining the high reliability of the device. In particular, the Applicant has made the portion 73 of the groove 70 with an angular extent of around 10-20° in a device with a diameter of around 1.5 cm. In this way, by fitting this device with the rack 6, it is possible to activate the release mechanism with an angular movement of the door of only a few degrees.

It is understood that the invention is not limited to the embodiments described and illustrated here, but that the shape and arrangements of parts, construction and operating details can be modified. For example, the arm element could be mounted on the disc portion of the rotor, while the groove could be formed in the base of the chamber itself. Alternatively, it is possible to arrange these latch means between the upper surface of the disc portion and the lower surface of the casing lid, or on both sides of the disc portion.

The groove 70, 70', 70" can of course be orientated as a mirror image of that described, thereby causing the device to be locked or released by rotation in the opposite sense to that described above.

In addition, the device according to the first embodiment can be coupled with a rectilinear rack in order to control the movement of a slidable drawer.

The invention claimed is:

1. A device for slowing the movement of a door, drawer or similar member movable with respect to a fixed structure and urged by unidirectional thrust means, including:
   a casing adapted to be fixed to said movable member or to said structure (S) and defining a substantially cylindrical chamber containing a viscous braking fluid,
   a rotor housed within said chamber, said rotor including a disc portion fully immersed in said chamber and adapted to rotate inside said casing and a shaft portion extending axially from the centre of the disc portion and protruding through one of the end walls of the casing in such a way as to be able to be operatively associated with the other of said movable member or the structure,
   a pivotable arm element which is pivotably mounted on a first surface of one of said casing and rotor extending in a plane perpendicular to the axis of rotation of said rotor, said pivotable arm element having a pin portion at one end, and an elongate groove which is formed in a second surface of the other of said casing and rotor extending in a plane parallel to said first surface, wherein said elongate groove extends concentrically with the shaft portion of said rotor and is engageable by said pin portion of the arm element, said groove having a cam portion at one end dividing said groove into a return path and a forward path for said pin portion in such a way as to define, in cooperation with said thrust means, a releasable locking position for said rotor relative to the casing, wherein a recess is formed in said first surface which is adapted to face said second surface, wherein a pin protrudes from the bottom of said recess and wherein said pivotable arm element is pivotably mounted on said pin of said recess and abuts against the bottom of said recess in such a way that the pivotable arm element is able to oscillate in the bottom of the recess, said pin portion protruding across said first surface for engaging said elongate groove.

2. A device according to claim 1 in which said pin of said recess is integrally formed with the casing or with the rotor.

3. A device according to claim 1, in which said arm element is formed in one piece.

4. A device according to claim 1, in which said first surface is the base surface of the chamber and said second surface is the lower surface of the disc portion of the rotor.

5. A device according to claim 1, in which said disc portion of the rotor has a plurality of vane portions extending radially therefrom.

\* \* \* \* \*